Aug. 25, 1931.  L. CYGON  1,820,378
TIME CALCULATING AND WAGE COMPUTING MACHINE
Filed July 23, 1928  3 Sheets-Sheet 2
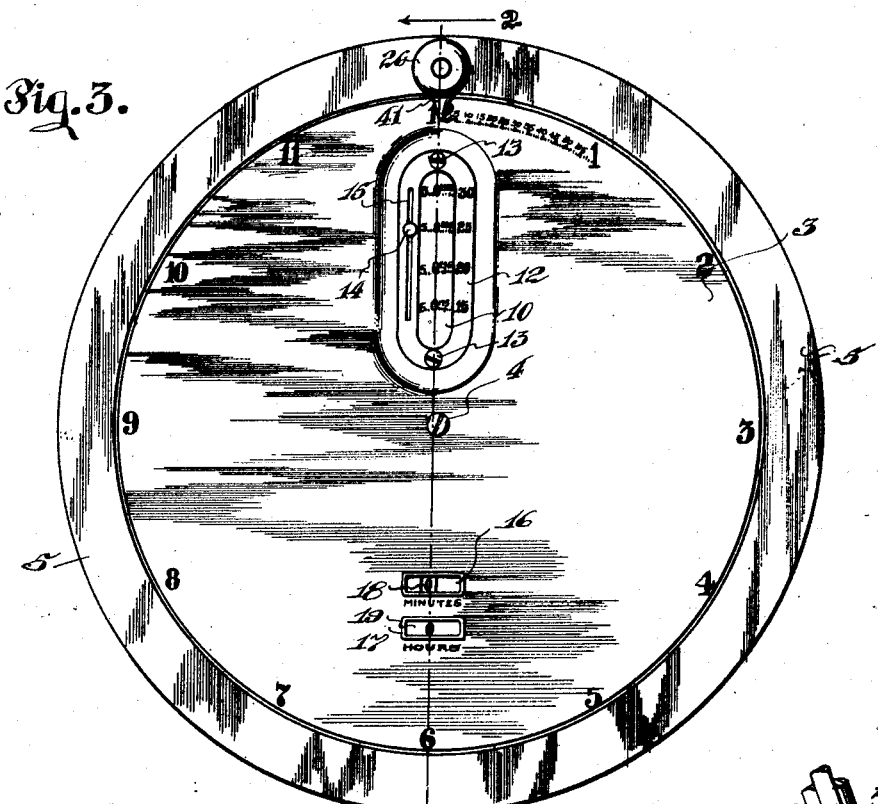
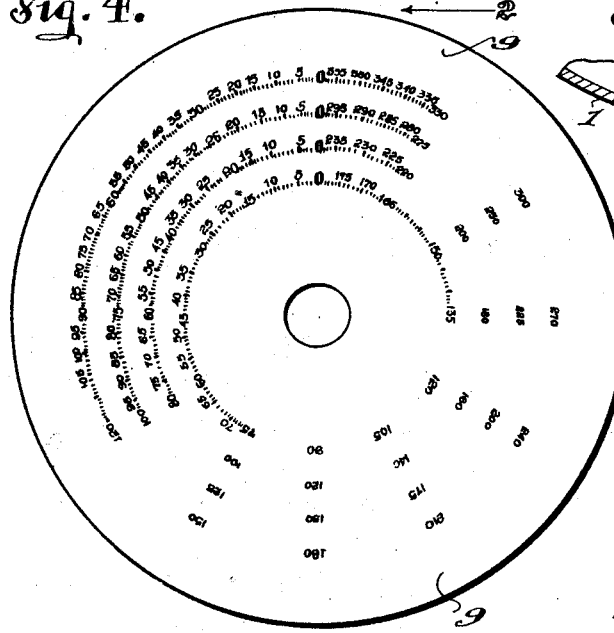
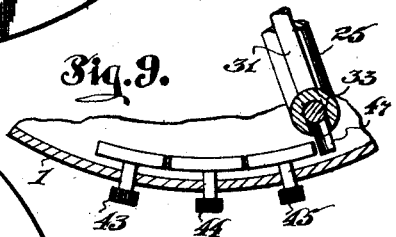
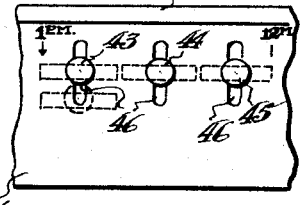
L. Cygon
INVENTOR
BY Ernest H. Wood
ATTORNEY Aug. 25, 1931.  L. CYGON  1,820,378
TIME CALCULATING AND WAGE COMPUTING MACHINE
Filed July 23, 1928  3 Sheets-Sheet 3
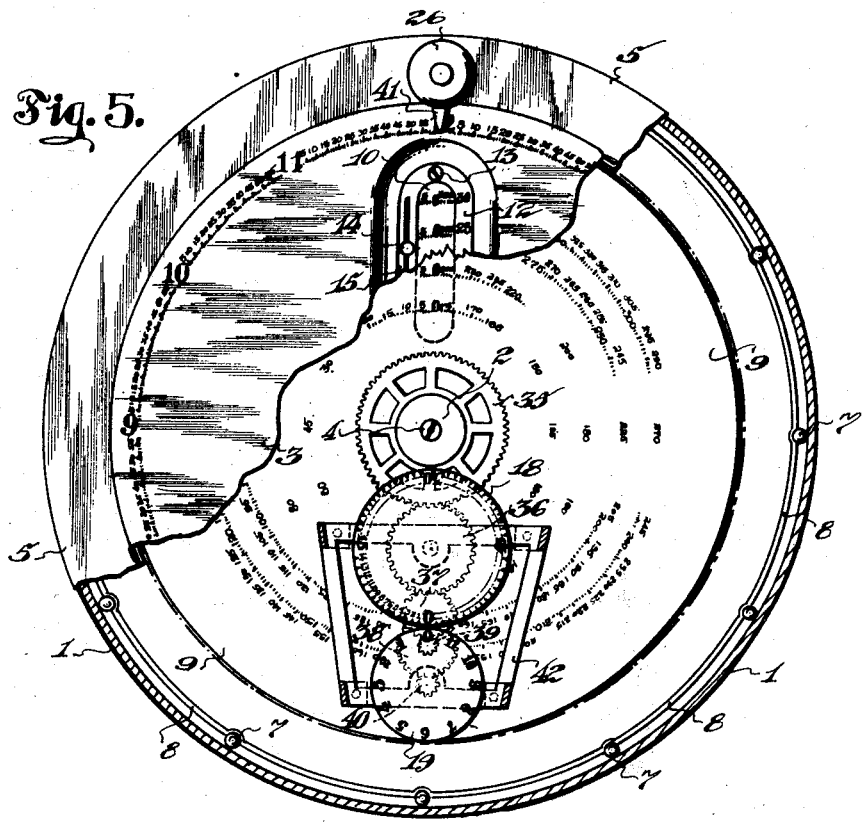
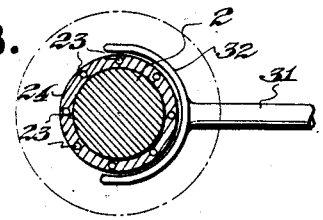
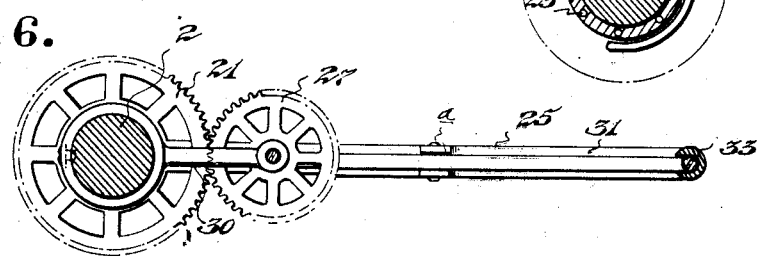
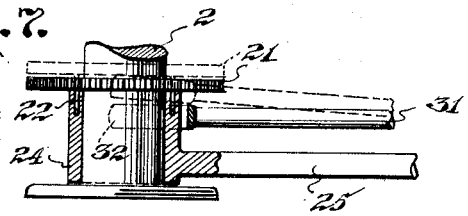
L. Cygon
INVENTOR.
BY
ATTORNEY.

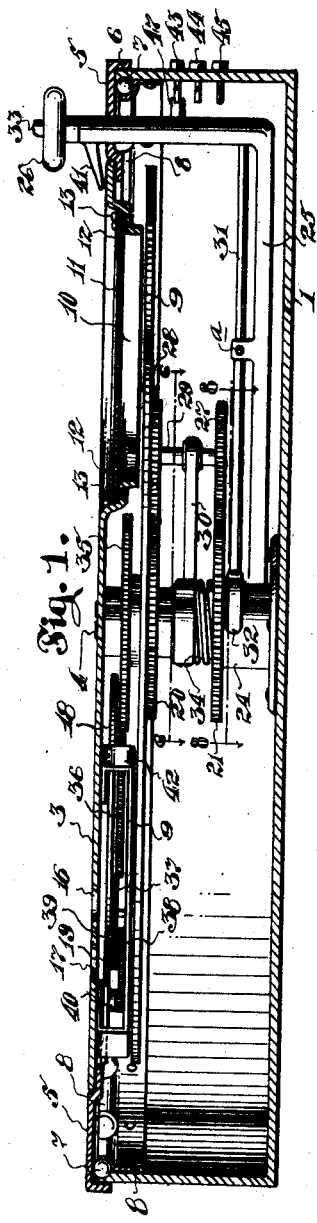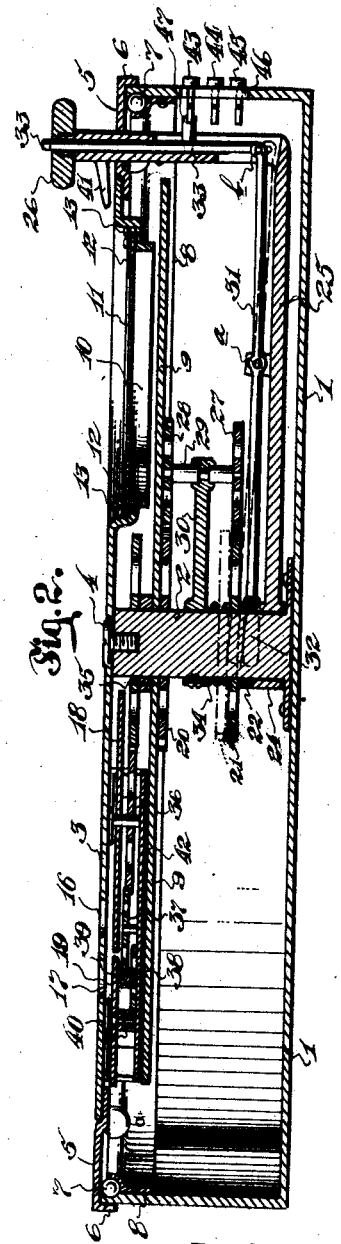

Patented Aug. 25, 1931

1,820,378

UNITED STATES PATENT OFFICE

LEON CYGON, OF WICHITA FALLS, TEXAS, ASSIGNOR OF ONE-HALF TO WAYLAND D. KEITH, OF BURKBURNETT, TEXAS

TIME CALCULATING AND WAGE COMPUTING MACHINE

Application filed July 23, 1928. Serial No. 294,603.

This invention relates to time calculating and computing instruments and it refers especially to certain improvements in instruments for computing wages according to a pre-arranged scale, and the principal object thereof resides in the provision of such an instrument as specified, having therein a series of dials on which is arranged characters indicative of time and charted earnings, and further provided with means for rotating the dials whereby to bring the figures on the chart in register with the operative figures on the pre-arranged scale in accordance with the specified time disclosed by the companion dials, and through the medium of which, earnings of an employé or workman may be quickly determined and substantiated by the time indicating dials.

Another object of the invention resides in the provision of an instrument of the character specified in which provisions are made to permit changing of the computing dial as the scale is altered, with readiness.

Still further, the invention aims among its objects to provide means for causing the time and computing dials to cease registering during periods when the workmen are not occupied, such for example, as noon periods, said means being so arranged as to interrupt the dials in periods of fifteen minutes, thirty minutes, forty-five minutes and an hour, as the case may be.

Broadly, the invention comprehends an instrument designed to operate in conjunction with a time clock and from which may be procured the working time of the employé whose earnings are being calculated and after having so determined the actual working periods, the invention is adapted to compute the actual earnings from the time.

With the foregoing objects as paramount, the invention has particular reference to its salient features of construction and arrangement of parts by which these, as well as other objects are attained, and which will become manifest as the description proceeds, taken in connection with the accompanying drawings, wherein—

Figure 1 represents an elevational view in vertical section, showing the relative positions of dials and operating wheels.

Figure 2 is a similar view but taken on a diametrical line through the exact center of the instrument.

Figure 3 shows the preferred design carried out in the face of the instrument.

Figure 4 is a detail view of the preferred form of computing dial used in the invention, showing only a part of the characters actually appearing thereon.

Figure 5 is a further view of the face of the instrument, with a portion of the face broken away to illustrate the mounting of the dials and the operating mechanism.

Figure 6 is a detail view on lines 6—6 of Figure 1.

Figure 7 is a detail view in fragmentary section showing a type of clutch by which the dial operating mechanism is thrown into and out of gear with the pointer post.

Figure 8 is a detail view on lines 8—8 of Figure 1.

Figure 9 is a fragmentary detail view of the period stops and their relationship with the pointer post, and Figure 10 is a further view of the period stops showing the manner in which they are moved to alter the periods of disengagement between the pointer post and the dial operating mechanism.

In proceeding further and more in detail with the invention, it may be stated for the sake of clarity that heretofore, it has been a difficult matter to properly compute wages of employes of large manufacturing and industrial firms, and especially when the employes are engaged on a piece-work basis, that is, when the employes have no definite time to report for duty or to leave their posts. In the latter regard, the time-keeper or bookkeeper is depended upon to keep the record of each employé with exactness and to see that he is properly compensated for all of the time he is occupied while on duty as indicated by the time clock. Due to the complicated nature of the work necessary in keeping such records properly, it is frequently the case that an error is made either in favor of the employé or the firm, which sometimes brings about contention and dissatisfaction. Moreover, the exacting work is trying upon the person whose duty it is to keep such records.

Accordingly, the invention is comprised primarily of a shell or casing 1 in which is mounted a center post. When assembled, a face plate 3 is secured in the manner shown in Figures 1 and 2 especially, to the center post 2 by screw 4.

As apparent in the drawings, the face plate 3 is of less diameter than the shell 1, and an annular ring 5 surrounds the plate, underlying the same at its outer edge and having a flange 6 overhanging the walls of the shell 1. In this manner the ring 5 is retained in rotative relationship with the shell 1 and face plate 3, and to relieve friction during such rotation, a series of balls 7 are retained immediately under the ring 5 by a conforming retainer 8, against which the ring engages.

In practical application of the invention, and in order to render the same efficient and complete in every respect, it is considered of advantage to provide three dials, one of which is herein termed the computing dial, another, the minute dial and the other the hour dial. The computing dial is the largest and is referred to by the character 9 and shown exclusively in Figure 4. This dial, as apparent, bears figures arranged in concentric circles, from zero progressively upward. While it is not intended that the dial 9 be restricted as to design, the dial shown has four circles of figures with a prominent zero in each circle, all of which are in alinement. This dial is mounted upon the center post 2 to rotate thereon, in the manner shown in Figures 1 and 2, also 5.

A preferably oblong slot or window 10 is made in the face plate 3, over which is mounted a glass panel 11; see Figures 1 and 2. As apparent in Figure 3; a scale indicator 12 is interchangeably mounted in a seat encircling the slot 10 and held by screws 13. It is the purpose of this scale to denote the rate being used by the owner of the instrument, and while the scale illustrated shows the low hourly rate of 15 cents to 30 cents, it is obvious that the scale may be substituted for one bearing the rates of the purchaser, regardless of what they may be. It is of course, necessary to change the computing dial 9 for another bearing figures corresponding to the rates on the new scale. On the side opposite the rates on the scale 12 is arranged a small pointer 14, arranged to be movable in a slot 15 so as to point out the rate being used.

The figures on the computing dial 9 are, as seen in Figures 3 and 5, visible through the slot 10, each row or circle of figures on the dial, registering with the column of numerals on the margin of the slot, representing the scale, each numeral representing a different rate, and the numeral opposite the pointer 14 representing the operative rate.

Immediately below the slot 10 in Figure 3 may be seen two small windows 16 and 17. Through these windows may be seen the figures on the margins of the minute and hour dials progressively as they revolve and which are arranged in size and speed to coordinate with the computing dial 9. These dials are referred to by characters 18 and 19, denoting the minute and hour dials respectively. The minute dial 18 is arranged, as will be presently brought out, to rotate in an anti-clockwise direction, while the hour dial 19 rotates in a clockwise direction, and the minute dial makes 12 revolutions while the hour dial makes one revolution.

With special reference now to the operating mechanism of the dials 9, 18 and 19, attention is directed to Figures 1, 2 and 5.

Wheels 20 and 21 are arranged on the center shaft 2 so as to turn freely thereon, and are disposed one above the other, the latter being both rotative and capable of movement vertically on the center post as exemplified in dotted lines in Figures 2 and 7. The wheel 21 is provided with a series of pins 22 which pins enter openings 23 made in a collar 24, surrounding the center post 2 below wheel 21. This feature enables the wheel 21 to move upward upon the center post without disengaging itself from the collar 24. See Figure 7.

The collar 24 is rotated about the center post 2 by an arm 25 connected thereto, extending radially therefrom and upward through the annular ring 5 encircling the face plate 3, and forming the operating handle 26 of the instrument. It is obvious that when the knob or handle 26 is moved circumferentially, it carries with it the ring 5, as well as moving the collar 24 about the center post 2, thus the wheel 21 is revolved, and the latter being enmeshed with a smaller wheel 27, this wheel is also revolved, which in turn rotates a similar wheel 28 thereabove through stub shaft 29, supported from the center shaft 2 by bracket 30. This small wheel 28 is enmeshed with aforesaid wheel 20, which latter is affixed to the large computing dial 9. Thus, when the operating handle 26 is moved, the computing dial 9, through the mechanism described, moves accordingly.

It is frequently necessary to move the handle 26, which shall be hereinafter referred to as the pointer post, without moving the dials, in clearing the instrument. In order to do this, it is necessary to disengage the wheel 21 from the wheel 27. See Figures 2 and 7. An arm 31, having a bifurcated end 32, is pivoted at $a$ to the pointer post arm 25, and is further pivoted at $b$ to the stem 33 passing through the pointer post 26. The stem 33 protrudes through the knob on the pointer and pressure downward on this stem will obviously raise the bifurcated end of the arm 31, which embraces the collar 24 surrounding the center post 2. This bifurcated end, in moving upward, urges the wheel 21 upward against the resistance of spring 34, bearing on the wheel 21, thus disengaging the teeth of the latter with those of the wheel 27, consequently interrupting the rotation of the dials wihout stopping the movement of the pointer post 26.

Immediately above the computing dial 9, and also rotatable on the center post 2 is a wheel 35, connected to dial 9, said wheel 35 in turn engaging wheel 36, adjacent thereto and directly under the minute dial 18. This wheel 36 connected to dial 18, in turn engages a smaller wheel 37, which latter rotates a wheel 38 through an integral pinion 39. Hour dial 19 is then rotated in accordance with the speed of minute dial 18 through engagement of wheel 38 with pinion 40 affixed to the underside of dial 19.

It is of course understood that there are numerous ways of transmitting rotation to the dials other than that illustrated, the mechanism described being for purposes of illustration only.

The speed ratio of the several wheels constituting the dial operating mechanism is such as to cause the computing dial 9 to make one revolution in an anti-clockwise direction, while the minute dial makes 12 revolutions in a reverse or clockwise direction, and hour dial 19 makes one revolution in an anti-clockwise direction, and when the rotation of dial 9 is reversed, the movements of dials 18 and 19 are reversed accordingly.

It will be observed in Figures 3 and 5 that the face plate 3 is divided into twelve equal sections and progressively numbered and each section is divided into 60 equal sections, indicating hours and minutes respectively, much on the order of a conventional clock dial. The pointer post 26 has protruding therefrom in the direction of these figures, a pointer 41, as may be seen in Figures 1, 2, 3 and 5, and which follows the figures on the margin of the face plate 3, corresponding to those on the hour and minute dials. As the pointer 41 is moved from one numeral to another on the face plate dial, the hour dial 19 moves accordingly, as does the minute dial 18. For example; should the pointer 41 be moved from 9 to 12 on the face plate dial, the hour dial will make 1/4 of one revolution while the minute dial will make three complete revolutions, the hour dial registering "3" in the hour window 17, and the minute dial will show "0".

For the sake of convenience and economy in assembling the instrument, and to further aid in making necessary chart and scale changes, the dial operating mechanism, comprised of the wheels and pinions above described, are encased in a suitable skeleton frame 42, which may be better seen in Figure 5. This frame, as in Figures 1 and 2, may be connected in some manner to the underside of the face plate 3, the mechanism therein being so arranged as to coincide with mechanism already intact when the face plate 3 is applied.

The foregoing description is believed to render clear the co-operation between the several dials, their mode of operation and the results attained by such operation, and it has been hereinbefore mentioned that it is frequently necessary to interrupt the movement of the computing dial without interrupting the progressive movement of the pointer 41 carried by the pointer post 26 on face plate 3.

In this regard, reference is primarily made to Figures 1 and 2, showing what is termed herein "period stops" 43, 44 and 45. These stops are each arranged to be moved in a vertical plane in slots 46, as apparent in Figure 10, into the path of a projection 47, carried by the pointer post 26, as seen in Figures 1, 2 and 9.

It will be understood that in order to compensate for noon periods, these stops must be arranged from 12 a. m. to 1 p. m., and while only three of such stops are illustrated, more or less may be used, to suit the requirements of the owner. Since only three stops are illustrated, it will be assumed that each stop will occupy a space equalling 20 minutes within the hour period. Ordinarily, the noon period of the majority of establishments is one hour. Should this be the case, all of the stops are moved to the top of slot 46 so that the projection 47 carried by the pointer post 26 will engage therewith upon reaching the numeral "12" on the face plate dial. The pointer may not be further moved in a clockwise direction until the stem 33 is depressed, which action causes the projection 47 to be lowered to such position as to enable it to pass under the stops. But when this is done, the dials do not move, due to the fact that the wheel 21 is disengaged from the wheel 27 by the lifting action of the arm 31 pivoted to the stem 33. Consequently, the dial 9 fails to show earnings during the noon period, and the hour and minute dials do not register time except actual earning time. After having pressed the stem 33 downward to permit passing of the projetcion 47, the stem may be released, after which the projection is automatically held down by the stops themselves, until the pointer post is moved out of the path of the last stop. At this point the projection again moves to normal position, and wheel 21 is re-engaged with wheel 27, due to the action of spring 34, and the dials resume the process of calculation in accordance with the movement of the pointer post.

Should it be the policy of an establishment to allow only a fraction of an hour for lunch periods, one or more of the stops may be moved downward in the slots 46 to shorten the period of depression of the projection 47 and the consequent period of cessation in the rotation of the dials, in keeping with the designated lunch period.

Having described in detail the several parts of the invention, their assembly and relationship, the operation of the time calculating and computing machine is as follows:

The instrument having been cleared, that is, the pointer post having been manipulated to bring the several dials into such position as to disclose zeros in the slot 10 and windows 16 and 17, the instrument is in preparedness for computing.

For example, assuming that an employé earning 30 cents per hour goes on duty at 8:30; is allowed one hour for noon period and is off duty at 5:30. The pointer post 26 is rotatively moved with stem 33 pressed down so as not to disturb the position of the dials, until the pointer 41 reaches "8:30" on the face plate dial. The stem 33 is released, which action places the mechanism in readiness for operation. The pointer is then moved to 12 m., at which point the assembly of stops 43, 44, and 45 block the passage of the projection 47 until the stem 33 is again depressed, interrupting the movement of the dials. The stem is immediately released and after passing the stops, automatically resumes operative position, to impart rotation to the dials. The pointer 41 is continued around the circle of figures on the face plate 3 until 5:30 is reached, where it is stopped. At this point, the hour dial 19 will show the number of occupied hours to be "8," and the minute window will disclose the number of minutes to be "0." In accordance therewith, the computing dial 9 will show the employes earnings in this period of exactly eight hours to be $2.40, the amount being disclosed between the numeral "30" on the margin of the slot 10 and the pointer 14 opposite.

Considering that the instrument has been purchased for use in an establishment paying their employes a wage scale of from $1.00 to $2.00 per hour. It is necessary in such a case to substitute the scale shown in slot 10 for another showing the scale used, and the dial 9 must be changed accordingly Assuming that the time clock card of the employé shows that he went on duty at 9:23 a. m., was allowed one hour for lunch and went off duty at 4:52 p. m. The instrument is cleared to aline the ciphers in slot 10 and windows 16 and 17, after which the pointer 41 is moved to "9:23" on the face plate dial. The pointer arm is moved in a clockwise direction until interrupted by the stops, and continued around the dial from "1" to "4:52." The hour window should show "6" and the minute window "29," indicating that the actual earning time of the employé was six hours and twenty nine minutes. At the same time a reading of the computed wage in slot 10 opposite the "$1.50" rate on dial 9, should show that the sum of $9.73 had been earned by the employé.

It is understood of course that each time the rate is changed, the scale as well as the computing dial or chart 9 must also be changed accordingly, to bring about co-ordination in the registering of the several dials.

It should further be understood that it is not intended that the invention be restricted to the specific arrangement shown and described and that certain modifications and alterations may be resorted to from time to time as are considered practicable and within the scope of the appended claims.

I claim:

1. A time calculating and wage computing instrument comprising a housing, a stationary dial forming a cover for said housing and having an opening therein, a rotary computing dial in said housing, a stationary scale disposed about said opening and having indicia thereon corresponding to the computations on said computing dial, an arm carrying a pointer movable over said stationary dial, means intermediate the arm and rotating dial for actuating the latter, and means movable through said arm and engaging said dial actuating means for moving the latter into and out of engagement with said movable dial whereby the arm may be moved independently of said rotating dial.

2. A time calculating and wage computing instrument comprising a housing, a dial forming the cover of said housing and having an opening therein, a rotating dial in said housing disposed beneath said opening, a slotted tubular indicating arm within said housing having a portion extending above said stationary dial, means connecting the indicating arm and rotary dial for actuating the latter, means slidably carried in said indicating arm for rendering the rotating dial inoperative, a lug carried by said slidable means and extending through the slotted portion of the indicating arm and selective stop means carried by said casing and movable into and out of the path of said lug for arresting the motion of the indicating arm and rotary dial during nonremunerative periods in computing.

3. A time calculating and wage computing instrument comprising a housing having bottom and side walls and an open top, a vertically disposed shaft within said housing a stationary disk having an opening therein secured to said shaft and having its circumferential edge spaced from the side walls of the housing, a movable annular rim member supported by the side walls having its inner edge portion disposed beneath the edge portion of said stationary disk and having its outer edge portion overhanging the side walls of the housing exteriorly of the latter, a swinging tubular indicator arm having one end rotatably secured to said shaft and having its opposite end secured to and terminating above said annular rim member, a rotating disk having indicia thereon mounted on said shaft beneath said stationary disk, means connecting said indicating arm and said rotating disk for actuating the latter, and clutch means having a portion slidable through said indicator arm for rendering the rotating disk inoperative during nonremunerative periods in computing, without effecting the motion of said indicating arm.

4. A computing instrument comprising a housing having bottom and side walls and an open top, a vertically disposed standard within said housing, a stationary disk having a sight opening therein secured to said shaft and having its circumferential edge spaced from the side walls of the housing, a movable annular rim member supported by said side walls and having its inner edge portion disposed beneath the edge portion of the stationary disk and having its outer edge portion overhanging the side walls of the housing exteriorly of the latter, a movable dial carried by said standard beneath said stationary disk and movable so as to expose a portion thereof through said opening, a rotatable indicating arm carried by said standard having a tubular portion secured to and extending above said rim member for movement with the latter, actuating means disposed between the dial and indicating arm for rotating said dial and clutch means pivotally mounted on said indicating arm and having a part movable through and terminating above the tubular portion of said arm.

In testimony whereof I affix my signature.

LEON CYGON.